(12) United States Patent
Lee et al.

(10) Patent No.: US 8,866,755 B2
(45) Date of Patent: Oct. 21, 2014

(54) TOUCH-CONTROLLED ELECTRONIC APPARATUS AND RELATED ASSEMBLY METHOD

(75) Inventors: Hsin-Hao Lee, Taoyuan County (TW); Chia-Jun Chia, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 871 days.

(21) Appl. No.: 12/862,796

(22) Filed: Aug. 25, 2010

(65) Prior Publication Data

US 2011/0267284 A1 Nov. 3, 2011

(30) Foreign Application Priority Data

May 3, 2010 (TW) ................. 99114071 A

(51) Int. Cl.
*G06F 3/041* (2006.01)
*G06F 3/044* (2006.01)
*G06F 1/16* (2006.01)

(52) U.S. Cl.
CPC ............... *G06F 3/044* (2013.01); *G06F 3/041* (2013.01); *G06F 3/0418* (2013.01)
USPC .......................................... 345/173; 345/156

(58) Field of Classification Search
USPC ................................................ 345/156–184
See application file for complete search history.

(56) References Cited

U.S. PATENT DOCUMENTS

| 7,205,909 B2 * | 4/2007 | Lee ................................. 341/20 |
| 7,737,952 B2 * | 6/2010 | Shigetaka ..................... 345/173 |
| 8,421,890 B2 * | 4/2013 | Benkley, III .................. 348/294 |
| 2007/0022548 A1 * | 2/2007 | Abrams ............................ 8/471 |
| 2007/0062739 A1 * | 3/2007 | Philipp et al. .............. 178/18.06 |
| 2007/0268265 A1 * | 11/2007 | XiaoPing ....................... 345/173 |
| 2007/0291009 A1 * | 12/2007 | Wright et al. ................. 345/173 |
| 2008/0158181 A1 * | 7/2008 | Hamblin et al. .............. 345/173 |
| 2009/0244029 A1 | 10/2009 | Huang |
| 2009/0255737 A1 | 10/2009 | Chang |

(Continued)

FOREIGN PATENT DOCUMENTS

| CN | 101441516 A | 5/2009 |
| CN | 101470578 A | 7/2009 |

(Continued)

OTHER PUBLICATIONS

Search report issued on Aug. 5, 2011 for EP application No. 10009652.8, filing date Sep. 15, 2010, pp. 1-3.

(Continued)

*Primary Examiner* — Kent Chang
*Assistant Examiner* — William Lu
(74) *Attorney, Agent, or Firm* — Winston Hsu; Scott Margo

(57) ABSTRACT

A touch-controlled electronic apparatus includes a loading plate, a touch panel, a flexible PCB, a sensor pad, and a control circuit. The loading plate has a display touch area, a wire area, and a hot bonding area. The touch panel is disposed on the display touch area of the loading plate. The flexible PCB has a touch button area and a control circuit area. The sensor pad is disposed on the touch button area of the flexible PCB and is used as touch buttons. The control circuit is disposed on the control circuit area of the flexible PCB. The flexible PCB is disposed and bonded to the loading plate, wherein the touch button area is disposed on at least one of the wire area and the hot bonding area.

10 Claims, 5 Drawing Sheets

(56) References Cited

U.S. PATENT DOCUMENTS

| | | | |
|---|---|---|---|
| 2009/0289885 A1* | 11/2009 | Chao | 345/98 |
| 2009/0316351 A1* | 12/2009 | Zadesky et al. | 361/679.33 |
| 2010/0033443 A1* | 2/2010 | Hashimoto | 345/173 |
| 2010/0321305 A1* | 12/2010 | Chang et al. | 345/173 |
| 2011/0134075 A1* | 6/2011 | Takusa | 345/174 |
| 2011/0254146 A1* | 10/2011 | Cho et al. | 257/692 |
| 2011/0254758 A1* | 10/2011 | Lin et al. | 345/84 |
| 2011/0267284 A1* | 11/2011 | Lee et al. | 345/173 |

FOREIGN PATENT DOCUMENTS

| | | |
|---|---|---|
| TW | M337793 | 8/2008 |
| TW | M374607 | 2/2010 |
| TW | M375245 | 3/2010 |

OTHER PUBLICATIONS

Office action mailed on Sep. 5, 2012 for the China application No. 201010173893.1, filing date May 7, 2010, p. 1-5.

Office action mailed on Sep. 5, 2013 for the Taiwan application No. 099114071, filing date May 3, 2010, p. 1-4.

\* cited by examiner (4A)

(4B)

(4C)

TOUCH-CONTROLLED ELECTRONIC APPARATUS AND RELATED ASSEMBLY METHOD

BACKGROUND OF THE INVENTION

1. Field of the Invention

The present invention relates to a touch-controlled electronic apparatus and a related fabricating method, and more particularly, to a touch-controlled electronic apparatus having flat touch buttons and a method which utilizes a flexible PCB to design touch buttons on it.

2. Description of the Prior Art

In today's consumer electronics markets, portable electronic products such as personal digital assistants (PDAs), mobile phones, and PDA phones have already adopted a touch panel as their interface tool for data communication. Currently, the electronic products are usually designed with the trend of light weight and small size, hence there is no enough space to accommodate traditional input devices such as keyboards or mice. Furthermore, most of the physical mechanical buttons, such as metal dome keypads, hardwire switches, or resistive buttons, usually have demands for a fixed height, and moving elements are required to be disposed on the surface of the electronic products in order to provide actuations to the mechanical buttons. However, these mechanical buttons will not only increase the thickness of the electronic products but also cause problems of surface discontinuity. For this reason, designs with flat buttons can be adopted to replace the conventional mechanical buttons.

Nowadays, a capacitive touch panel is commonly used for implementing the flat buttons, which can provide touch functions of both a touch display area and a touch button area at the same time. Please refer to FIG. 1. FIG. 1 is a diagram illustrating a touch-controlled electronic apparatus 100 according to the prior art. In FIG. 1, the touch-controlled electronic apparatus 100 includes a loading plate 1100 and a touch panel (in order to clearly present the figure, the touch panel is not marked in FIG. 1). The loading plate 1100 has a display touch area 1110, a touch button area 1120, a wire area 1130, and a hot bonding area 1140. In the traditional method of work, the touch panel is disposed on both the display touch area 1110 and the touch button area 1120 of the loading board 1100. That is to say, a part of the touch panel is used for displaying images (i.e., the part of touch panel disposed upon the display touch area 1110), while another part of the touch panel is used as touch buttons (i.e., the part of the touch panel disposed upon the touch button 1120).

However, conductive patterns (e.g., conductive patterns composed of indium tin oxide (ITO) or indium zinc oxide (IZO)) of the current capacitive touch panel are electronically connected with its controller by utilizing silver wires surrounded the touch panel, so that the capacitive sensor differences of the conductive patterns can be calculated by the controller in order to obtain the position of touches. Because the touch buttons cannot overlay the abovementioned "sliver wires", that is, the touch button area 1120 cannot overlay the wire area 1130, the size of touch button area will cause the obstruction in designing the appearance and the length of the electronic products, as is shown in FIG. 1. For a fixed-scaled touch panel, the width of the wire area 1130 will be increased if the display touch area 1110 gets larger. For this reason, the touch button area 1120 will be constricted. The smaller the touch button area 1120 will cause the sensor area is too small, which leads to a poor sensor sensitivity.

Hence, how to provide the display touch area 1110 and the touch button area 1120 with a larger area, and how to solve erroneous sensing problems of touch buttons under considerations of a fixed-scaled touch panel and industrial designs, have become an important topic of designing the touch-controlled electronic apparatus.

SUMMARY OF THE INVENTION

It is one of the objectives of the claimed invention to provide a touch-controlled electronic apparatus and a related fabricating method to solve the abovementioned problems.

According to one embodiment, a touch-controlled electronic apparatus is provided. The touch-controlled electronic apparatus includes a loading plate, a touch panel, a flexible PCB, a sensor pad, and a control circuit. The loading plate has a display touch area, a wire area, and a first hot bonding area. The touch panel is disposed on the display touch area of the loading plate, for displaying images and receiving a first touch to generate a first touch signal. The flexible PCB has at least a touch button area and a control circuit area. The sensor pad is disposed on the touch button area of the flexible PCB, and is used as a touch button for detecting a second touch to generate a second touch signal. The control circuit is disposed on the control circuit area of the flexible PCB and electronically connected to the touch panel and the sensor pad, for reading the first touch signal as well as the second touch signal to respectively generate a first control signal as well as a second control signal, and for determining a first position of the first touch and a second position of the second touch according to the first control signal and the second control signal, respectively. The flexible PCB is disposed and bonded to the loading plate, and the touch button area is disposed on at least one of the wire area and the first hot bonding area.

According to a preferred embodiment, the touch button area overlays the wire area and the first hot bonding area.

According to another embodiment, a method for fabricating a touch-controlled electronic apparatus is provided. The method includes the steps of: providing a loading plate having a display touch area, a wire area, and a first hot bonding area; disposing a touch panel on the display touch area of the loading plate; providing a flexible PCB having at least a touch button area and a control circuit area; disposing a sensor pad on the touch button area of the flexible PCB, wherein the sensor pad is used as a touch button; disposing a control circuit on the control circuit area of the flexible PCB, and electronically connecting the control circuit to the touch panel and the sensor pad; and disposing and bonding the flexible PCB to the loading plate, such that the touch button area is disposed on at least one of the wire area and the first hot bonding area.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
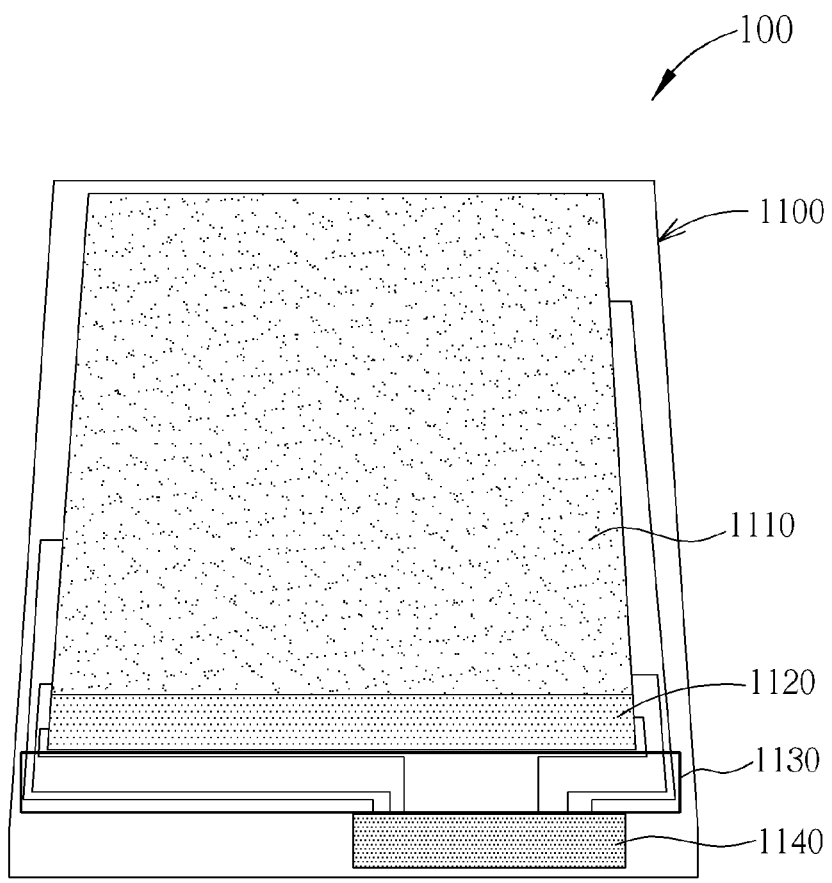
FIG. 1 is a diagram illustrating a touch-controlled electronic apparatus according to the prior art.
Figure 2:
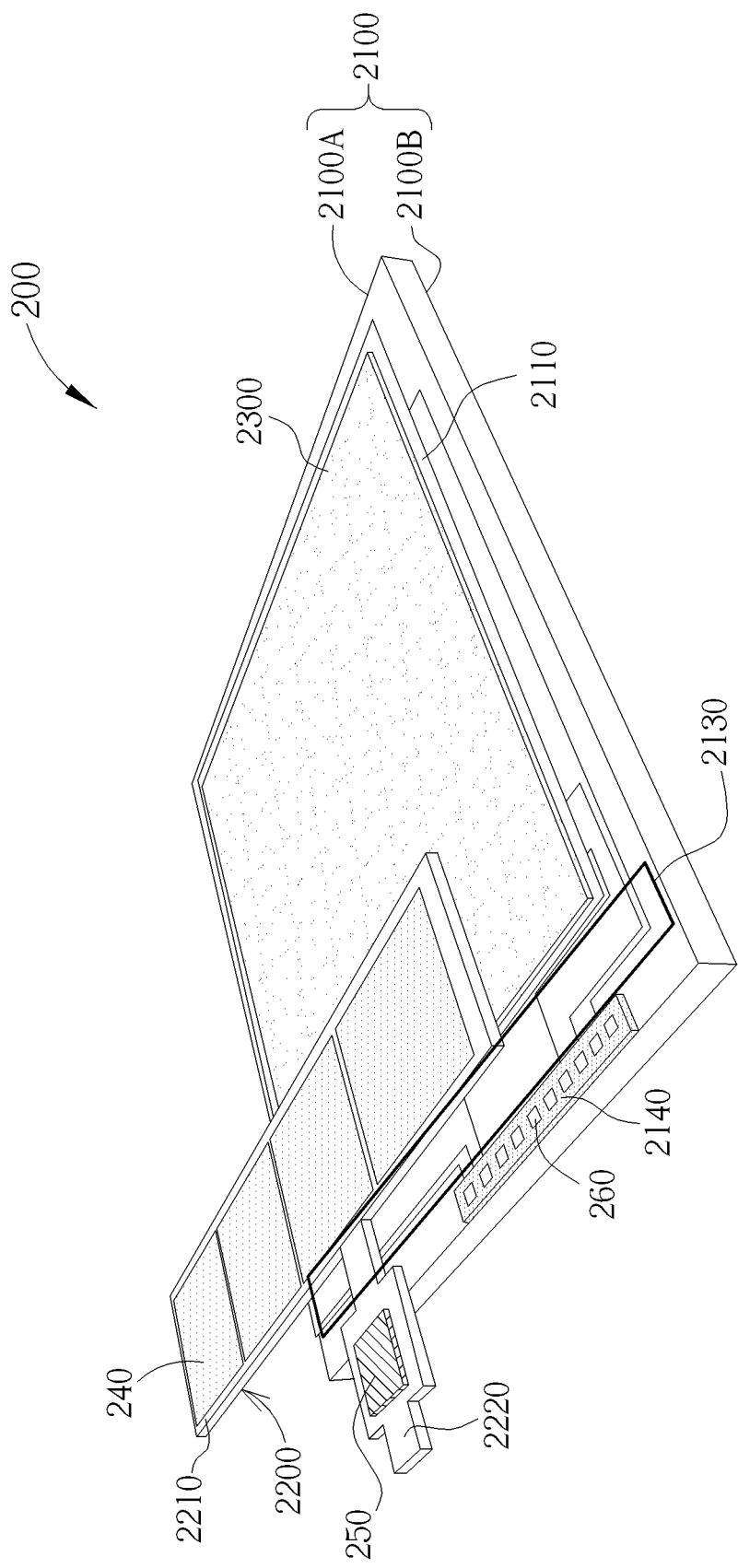
FIG. 2 is diagram illustrating the architecture and the fabrication of a touch-controlled electronic apparatus according to an embodiment of the present invention.

Please refer to FIG. 2. FIG. 2 is diagram illustrating the architecture and the fabrication of a touch-controlled electronic apparatus 200 according to an embodiment of the present invention. As shown in FIG. 2, the touch-controlled electronic apparatus 200 includes, but is not limited to, a loading plate 2100, a touch panel 2300, a flexible printed circuit board (PCB) 2200, a sensor pad 240, and a control circuit 250. The loading plate 2100 has a third plane 2100A and a fourth plane 2100B opposite to the third plane 2100A, wherein the third plane 2100A is divided into a display touch area 2110, a wire area 2130, and a first hot bonding area 2140. The touch panel 2300 is disposed on the display touch area 2110 of the loading plate 2100, for displaying images and receiving a first touch to generate a first touch signal.

Figure 3:
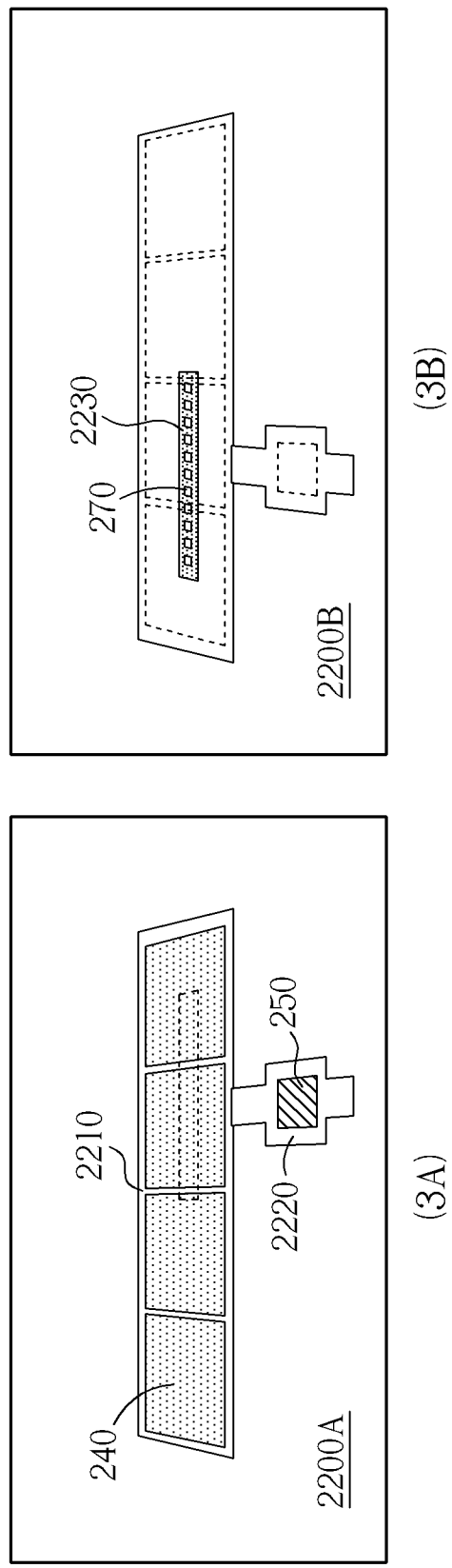
FIG. 3 (including 3A and 3B) illustrates a top view and a bottom view of the flexible PCB shown in FIG. 2.

In addition, the flexible PCB 2200 has a first plane 2200A and a second plane 2200B opposite to the first plane 2200A. Please also refer to FIG. 3. FIG. 3 (including 3A and 3B) illustrates a top view and a bottom view of the flexible PCB 2200 shown in FIG. 2. As shown in 3A, the first plane 2200A of the flexible PCB 2200 is divided into at least a touch button area 2210 and a control circuit area 2220. Moreover, the sensor pad 240 is disposed on the touch button area 2210 of the flexible PCB 2200, and is used as a touch button for detecting a second touch to generate a second touch signal. The control circuit 250 is disposed on the control circuit area 2220 of the first plane 2200A of the flexible PCB 2200 and electronically connected to the touch panel 2300 and the sensor pad 240, for reading the first touch signal as well as the second touch signal to respectively generate a first control signal as well as a second control signal, and for determining a first position of the first touch and a second position of the second touch according to the first control signal and the second control signal, respectively. As shown in 3B, the second plane 2200B of the flexible PCB 2200 has a second hot bonding area 2230. Be noted that the second plane 2200B of the flexible PCB 2200 contacts and bonds to the third plane 2100A of the loading plate 2100 (as is shown in FIG. 2), such that the second hot bonding area 2230 overlays the first hot bonding area 2140.

Moreover, a first contact pad 260 is disposed on the first hot bonding area 2140 of the loading plate 2100 (as is shown in FIG. 2), and a second contact pad 270 is disposed on the second hot bonding area 2230 of the flexible PCB 2200 (as is shown in 3B). The first contact pad 260 is hot bonded to the second contact pad 270, such that the control circuit 250 is able to electrically connected to the touch panel 230 via the first contact pad 260 and the second contact pad 270.

What calls for special attention is that: the flexible PCB 2200 is disposed and bonded to the loading plate 2100, and the touch button area 2210 of the flexible PCB 2200 is disposed on at least one of the wire area 2130 and the first hot bonding area 2140 of the loading plate 2100. In this embodiment, the touch button area 2210 overlays both the wire area 2130 and the first hot bonding area 2140, such that the sensing area of the touch button can be maximized in order to get a better sensor sensitivity. But this is not meant to be a limitation of the present invention. Those skilled in the art should appreciate that various modifications to the covering range of the touch button area 2210 may be made without departing from the spirit of the present invention, which can be designed depending upon actual demands. For example, in other embodiment, the touch button area 2210 may overlay the wire area 2130, the first hot bonding area 2140, and apart of the display touch area 2110, which also belongs to the scope of the present invention.

Please note that the abovementioned touch-controlled electronic apparatus 200 can be a mobile phone, a personal digital assistant (PDA), a PDA phone or a smart phone. But this should not be considered as limitations of the present invention, and the touch-controlled electronic apparatus 200 can be a touch-controlled electronic apparatus of other types. Moreover, the sensor pad 240 can be composed of a copper material, and the copper material may include a particular conductive pattern, but the present invention is not limited to this only.

In one wore, the touch-controlled electronic apparatus disclosed in the present invention utilizes the flexible PCB 2200 to design touch buttons on it (i.e., the touch button area 2210). Since the touch button area 2210 overlays at least the wire area 2130 and the first hot bonding area 2140, the display touch area 2110 can be maximized and the sensing area of the touch button area 2210 can be significantly improved under a fixed-scaled touch panel. Besides, the touch buttons disclosed in the present invention adopt a design of flat buttons, which can confirm to considerations of industrial designs and product appearance.

Figure 4:
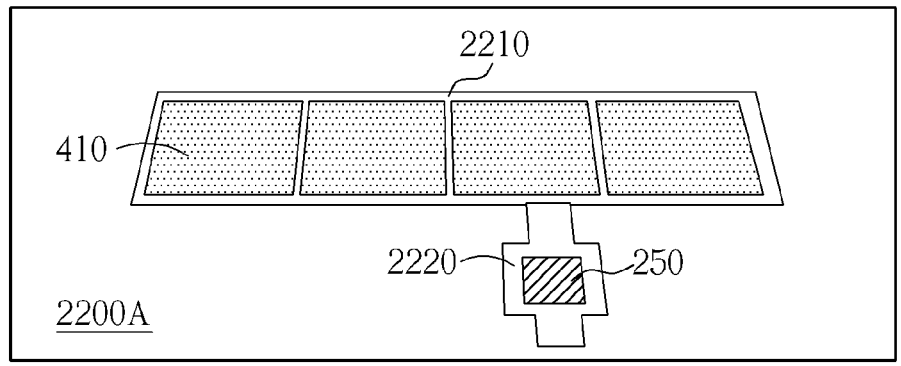
FIG. 4 (including 4A, 4B, and 4C) is a diagram illustrating exemplary embodiments of the particular conductive patterns of the sensor pad shown in FIG. 2.
Figure 4:
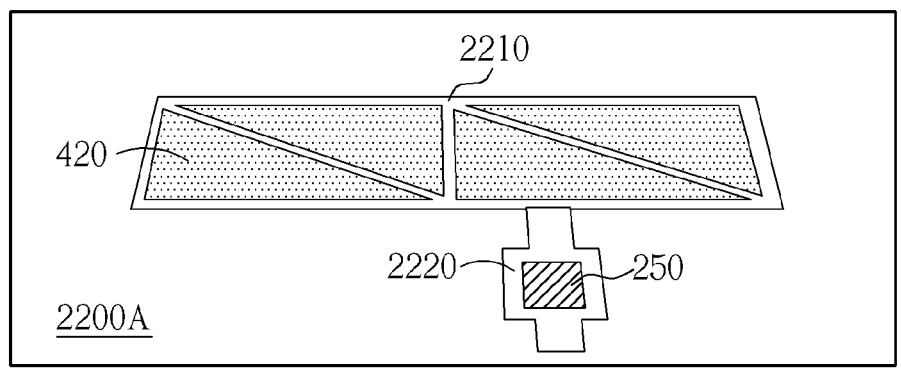
Figure 4:
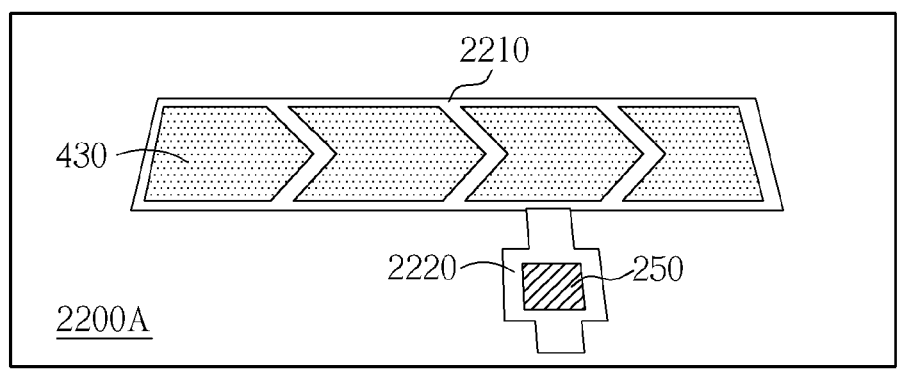

Please refer to FIG. 4. FIG. 4 (including 4A, 4B, and 4C) is a diagram illustrating exemplary embodiments of the particular conductive patterns of the sensor pad 240 shown in FIG. 2. As can be known from FIG. 4, the particular conductive patterns of the sensor pad 240 can be a square (such as the particular conductive pattern 410 shown in 4A), a triangle (such as the particular conductive pattern 420 shown in 4B), or an irregular shape (such as the particular conductive pattern 430 shown in 4C). That is to say, the particular conductive patterns of the sensor pad 240 are not limited. Those skilled in the art should appreciate that various modifications of the particular conductive patterns of the sensor pad 240 may be made, which can be designed depending upon actual demands.

Figure 5:
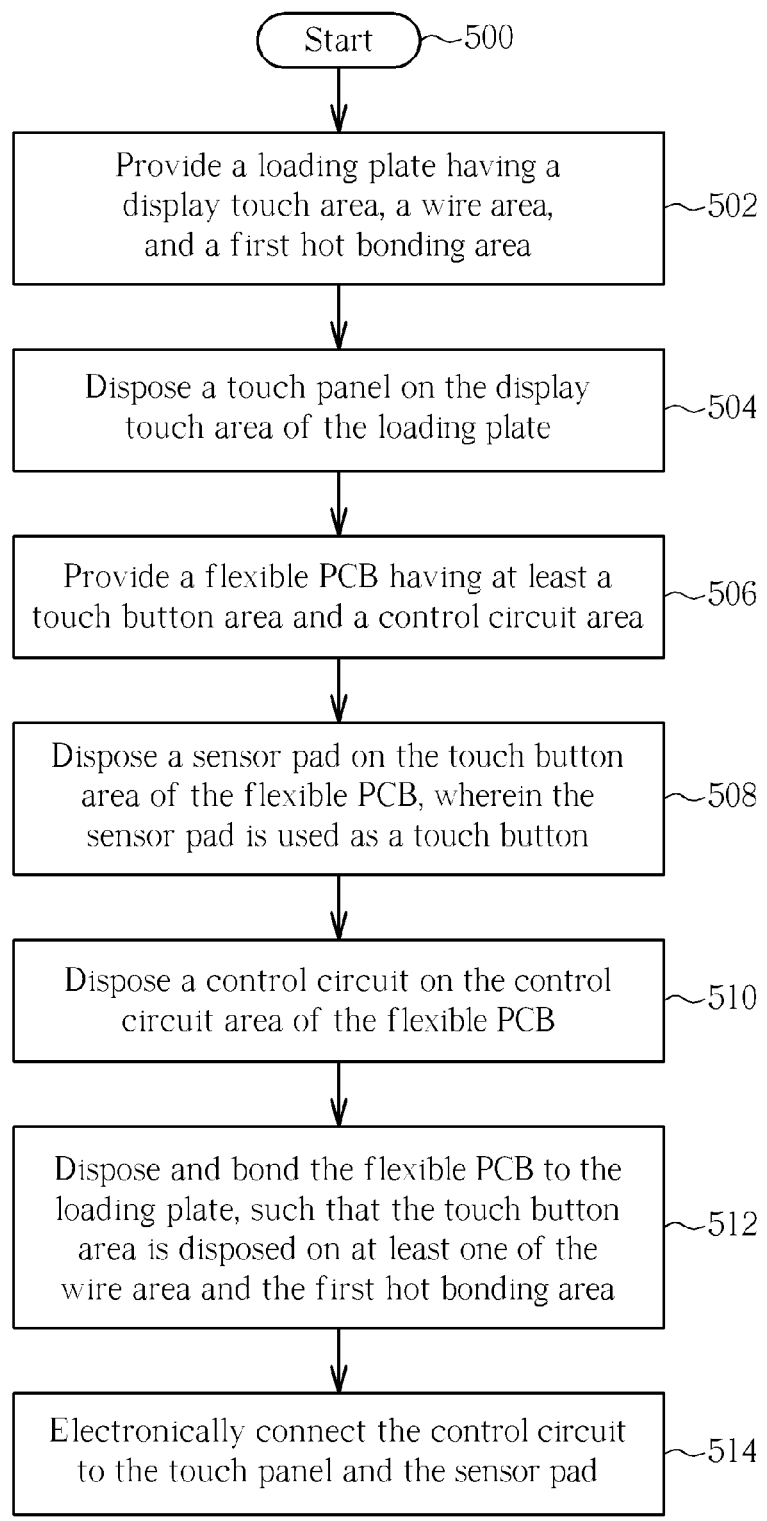
FIG. 5 is a flowchart illustrating a method for fabrication a touch-controlled electronic apparatus according to an exemplary embodiment of the present invention.

Please refer to FIG. 5. FIG. 5 is a flowchart illustrating a method for fabrication a touch-controlled electronic apparatus according to an exemplary embodiment of the present invention. Please note that the following steps are not limited to be performed according to the exact sequence shown in FIG. 5 if a roughly identical result can be obtained. The method includes, but is not limited to, the following steps:

Step 500: Start.

Step 502: Provide a loading plate having a display touch area, a wire area, and a first hot bonding area.

Step 504: Dispose a touch panel on the display touch area of the loading plate.

Step 506: Provide a flexible PCB having at least a touch button area and a control circuit area.

Step 508: Dispose a sensor pad on the touch button area of the flexible PCB, wherein the sensor pad is used as a touch button.

Step 510: Dispose a control circuit on the control circuit area of the flexible PCB.

Step 512: Dispose and bond the flexible PCB to the loading plate, such that the touch button area is disposed on at least one of the wire area and the first hot bonding area.

Step 514: Electronically connect the control circuit to the touch panel and the sensor pad.

In the following descriptions, how to fabricate the touch-controlled electronic apparatus 200 can be known by collocating the steps shown in FIG. 5 and the elements shown in FIG. 2 and FIG. 3. First, the loading plate 2100 is provided, and the third plane 2100A of the loading plate 2100 has the display touch area 2110, the wire area 2130, and the first hot bonding area 2140 (the step 502). After that, the touch panel 2300 is disposed on the display touch area 2110 of the loading plate 2100 (the step 504). The flexible PCB 2200 is provided, and the first plane 2200A of the flexible PCB 2200 has at least the touch button area 2210 and the control circuit area 2220 (the step 506). After that, the sensor pad 240 is disposed on the touch button area 2210 of the flexible PCB 2200, and is used as touch buttons (the step 508). Furthermore, the control circuit 250 is disposed on the control circuit area 2220 of the flexible PCB 2200 (the step 510). The flexible PCB 2200 is disposed and bonded to the loading plate 2100, such that the touch button area 2210 can be disposed on at least one of the wire area 2130 and the first hot bonding area 2140 (the step 512). Preferably, the touch button area 2210 overlays both the wire area 2130 and the first hot bonding area 2140. Finally, the control circuit 250 is electronically connected to touch panel 2300 (for example, the first contact pad 260 and the second contact pad 270 can be utilized for electronically connecting the control circuit 250 to the touch panel 2300) and the sensor pad 240 (the step 514).

Please note that, the steps of the abovementioned flowchart are merely practicable embodiments of the present invention, and in no way should be considered to be limitations of the scope of the present invention. The method can include other intermediate steps or several steps can be merged into a single step without departing from the spirit of the present invention.

The abovementioned embodiments are presented merely for describing features of the present invention, and in no way should be considered to be limitations of the scope of the present invention. In summary, the present invention provides a touch-controlled electronic apparatus and a related fabricating method. A flexible PCB is utilized in the touch-controlled electronic apparatus disclosed in the present invention so as to design the touch buttons on it (i.e., the touch button area 2210). Since the touch button area 2210 overlays at least the wire area 2130 and the first hot bonding area 2140 of the loading plate 2100, the display touch area 2110 can be maximized and the sensing area of the touch button area 2210 can be significantly improved to obtain a better sensor sensitivity under a fixed-scaled touch panel. Besides, by collocating the touch-controlled electronic apparatus together with its fabrication disclosed in the present invention, traditional mechanical buttons can be replaced and a design of flat touch buttons can be achieved, which can confirm to considerations of industrial designs and product appearance.

Those skilled in the art will readily observe that numerous modifications and alterations of the device and method may be made while retaining the teachings of the invention.

What is claimed is:

1. A touch-controlled electronic apparatus, comprising:
   a loading plate, having a display touch area, a wire area, and a first hot bonding area;
   a touch panel, disposed on the display touch area of the loading plate, for receiving a first touch to generate a first touch signal;
   a flexible printed circuit board (PCB), having at least a touch button area and a control circuit area;
   a sensor pad, disposed on the touch button area of the flexible PCB, and used as a touch button for detecting a second touch to generate a second touch signal; and
   a control circuit, disposed on the control circuit area of the flexible PCB and electronically connected to the touch panel and the sensor pad, for reading the first touch signal as well as the second touch signal to respectively generate a first control signal as well as a second control signal, and for determining a first position of the first touch and a second position of the second touch according to the first control signal and the second control signal, respectively;
   wherein the flexible PCB is disposed and bonded to the loading plate, and the touch button area is disposed on at least one of the wire area and the first hot bonding area; and wherein the flexible PCB comprises a first plane and a second plane opposite to the first plane, the first plane is divided into the touch button area and the control circuit area, and the flexible PCB further comprises a second hot bonding area, and the second hot bonding area is located on the second plane.

2. The touch-controlled electronic apparatus of claim 1, wherein the loading plate comprises a third plane and a fourth plane opposite to the third plane, and wherein the third plane is divided into the display touch area, the wire area, and the first hot bonding area; and the second plane of the flexible PCB contacts and bonds to the third plane of the loading plate.

3. The touch-controlled electronic apparatus of claim 1, wherein the second hot bonding area overlays the first hot bonding area.

4. The touch-controlled electronic apparatus of claim 3, further comprising:
   a first contact pad, disposed on the first hot bonding area; and
   a second contact pad, disposed on the second hot bonding area;
   wherein the first contact pad bonds to the second contact pad, and the control circuit is electrically connected to the touch panel via the first contact pad and the second contact pad.

5. The touch-controlled electronic apparatus of claim 1, wherein the sensor pad is composed of a copper material, and the copper material comprises a particular conductive pattern.

6. The touch-controlled electronic apparatus of claim 1, wherein the touch-controlled electronic apparatus is a mobile phone, a personal digital assistant (PDA), a PDA phone, or a smart phone.

7. A method for fabricating a touch-controlled electronic apparatus, comprising the steps of:
   providing a loading plate having a display touch area, a wire area, and a first hot bonding area;
   disposing a touch panel on the display touch area of the loading plate;
   providing a flexible PCB having at least a touch button area and a control circuit area;
   disposing a sensor pad on the touch button area of the flexible PCB, wherein the sensor pad is used as a touch button;
   disposing a control circuit on the control circuit area of the flexible PCB, and electronically connecting the control circuit to the touch panel and the sensor pad; and
   disposing and bonding the flexible PCB to the loading plate, such that the touch button area is disposed on at least one of the wire area and the first hot bonding area;
   wherein the flexible PCB comprises a first plane and a second plane opposite to the first plane, the first plane is divided into the touch button area and the control circuit area, and the flexible PCB further comprises a second hot bonding area, and the second hot bonding area is located on the second plane.

8. The method of claim 7, wherein the loading plate comprises a third plane and a fourth plane opposite to the third plane, and wherein the third plane is divided into the display touch area, the wire area, and the first hot bonding area; and the method further comprises the step of:

making the second plane of the flexible PCB contact and bond to the third plane of the loading plate.

9. The method of claim 8, wherein the flexible PCB further comprises a second hot bonding area located on the second plane; and the method further comprises the step of:

disposing and bonding the flexible PCB to the loading plate, such that the second hot bonding area overlays the first hot bonding area.

10. The method of claim 9, wherein the touch-controlled electronic apparatus further comprises a first contact pad and a second contract pad, being respectively disposed on the first hot bonding area and the second hot bonding area; and the method further comprises the step of:

disposing and bonding the flexible PCB on the loading plate, and bonding the first contact pad and the second contact pad; and electrically connecting the control circuit to the touch panel by utilizing the first contact pad and the second contact pad.

* * * * *